United States Patent [19]
Davis et al.

[11] Patent Number: 5,898,889
[45] Date of Patent: Apr. 27, 1999

[54] QUALIFIED BURST CACHE FOR TRANSFER OF DATA BETWEEN DISPARATE CLOCK DOMAINS

[75] Inventors: Eric R. Davis; David R. Brown, both of San Jose, Calif.

[73] Assignee: 3Com Corporation, Santa Clara, Calif.

[21] Appl. No.: 08/641,401

[22] Filed: Apr. 30, 1996

[51] Int. Cl.[6] .......................... G06F 13/28; G06F 13/376; G06F 13/82

[52] U.S. Cl. ............... 395/849; 395/200.63; 395/200.64; 395/855; 395/873; 711/130; 711/144; 711/150

[58] Field of Search .................. 395/200.64, 200.63, 395/849, 855, 873; 711/130, 144, 150

[56] References Cited

U.S. PATENT DOCUMENTS

| | | | |
|---|---|---|---|
| 4,447,873 | 5/1984 | Price et al. ............................. | 395/873 |
| 5,029,124 | 7/1991 | Leahy et al. ............................ | 395/285 |
| 5,163,132 | 11/1992 | Du Lac et al. .......................... | 395/873 |
| 5,412,782 | 5/1995 | Hausman et al. ..................... | 395/200.8 |
| 5,469,545 | 11/1995 | Vanbuskirk et al. ................ | 395/200.64 |
| 5,499,384 | 3/1996 | Lentz et al. ............................. | 395/308 |
| 5,579,503 | 11/1996 | Osborne ................................. | 711/119 |
| 5,644,729 | 7/1997 | Amini et al. ............................ | 395/821 |

*Primary Examiner*—Daniel H. Pan
*Assistant Examiner*—Jeffrey Allen Rossi
*Attorney, Agent, or Firm*—Townsend and Townsend and Crew LLP

[57] ABSTRACT

A qualified burst cache facilitates burst mode data transfer between a first clock domain and a second clock domain by simplifying cache control structures. A cache is marked as qualified when full or there is no more data to be written to the cache, allowing burst data to be transferred out of said cache. The invention has applications in network adapter cards for transferring data between a host system bus and a network where the bus and network operate at different speeds and are therefore part of different clock domains.

9 Claims, 3 Drawing Sheets

QUALIFIED BURST CACHE FOR TRANSFER OF DATA BETWEEN DISPARATE CLOCK DOMAINS

The present invention relates to communication of digital information. More particularly, the invention relates to using one or more qualified burst caches to improve the data transfer between two clock domains where at least one of the clock domains supports burst data transfers, such as a host computer bus that can support burst transfers and a network.

BACKGROUND OF THE INVENTION

The present invention is best understood in the context of a network adapter. A network adapter is a device well known in the art for connecting a digital computing device, such as a personal computer, to a communications network such as a local area network, or LAN.

One type of network adapter is discussed in coassigned U.S. Pat. No. 5,412,782, which is incorporated herein by reference. As described in that application, a network adapter generally connects to a multipurpose host computer data bus through programmed I/O (PIO), possibly with a direct memory access (DMA) mode available as a backup for receive operations. The described adapter generally was designed to operate on a network standard known as 10BaseT Ethernet, which operates at maximum network data speeds approaching 10 Megabits per second (Mbps).

Various aspects of other types of network adapters, some of which may be considered modifications or improvements of the just discussed adapter, are described in coassigned U.S. application Ser. No. 08/296,577 filed Aug. 08, 1994, now U.S. Pat. No. 5,640,605, which discusses an adapter for operating at 100 Mbps (100BaseT), coassigned U.S. application Ser. No. 08/544,745, now U.S. Pat. No. 5,715,287, which discusses an adapter connector for operating at both 10BaseT and 100BaseT, and coassigned U.S. application Ser. No. 08/641,399, filed Apr. 30, 1996 and entitled PACKET FILTERING BASED ON SOCKET OR APPLICATION IDENTIFICATION. Each of these pending related U.S. applications are incorporated herein by reference.

In the past several years the capabilities and speed of typical host computer systems placed on networks have improved dramatically and the demands placed on those systems have increased. The speed of networks has also increased. There is therefore a need for network adapters to evolve to handle higher data speeds and to more effectively operate on a host's system bus.

One modification made to high performance adapters is to modify how those adapters operate on the system bus. Higher performance adapters today can often act as bus master devices, rather than as PIO bus devices. Bus master devices can generally transfer more data while using less time on the system bus than can PIO devices.

Today, high performance system buses, such as EISA, and PCI generally allow bus master devices to operate in a burst mode. In burst mode, a bus master is allowed to transfer a high amount of data over the bus, with one bus word (up to four bytes) being transferred every bus cycle without interruption. This can provide the most efficient use of bus resources.

A problem network adapters have, however, in fully utilizing a burst mode on a system bus is that networks operate at a effective data speed that is generally much less than the system bus transmission speed. Therefore, a "burst mode" read operation on a bus will quickly drain any data received from the network on the adapter, and the network cannot deliver data to the adapter quickly enough to meet the burst mode requirements. For this reason, when moving a block of data between a burst mode host computer bus and a network, it is necessary to buffer data on the adapter to obtain the optimal throughput performance.

This problem can be thought of in generalized terms as arising whenever data is exchanged between two different computer systems operating at different speeds. These two areas of the computing environment can be referred to generally as two different clock domains. Referring to the example just discussed, the host bus can be thought of as representing one clock domain and the network and the adapter interface circuitry as another.

There are two common approaches for buffering data when transferring it between two clock domains: a FIFO (First-In-First-Out) memory or a high speed "dual-port" RAM (Random Access Memory), either of which be accessed by either clock domain in a random manner.

FIFOs are a well understood memory structure consisting of memory locations and read and write pointers that address one of the possible locations within the FIFO. When using a FIFO memory, as data is put into the FIFO, some incremental delay later it becomes available to be read out of the FIFO. FIFOs generally require a large number of circuit gates to implement because data must be able to be read from or written to the FIFO starting at any location in the memory. This requires a complex pointer and control structure that is difficult to design. A major part of a FIFO design entails always keeping track of the relationship between the read and write pointers and ensuring that there is either room for data to be written into the FIFO, or that data being read from the FIFO is valid.

The complexities of FIFO design and control are increased when an adapter interfaces to a host bus which supports a burst mode, especially when the bus master cannot pace the transfers, as is the case with EISA—Extended Industry Standard Architecture. This is because the EISA Specification does not allow the bus master to insert "wait" cycles on the bus once a burst transfer has begun and it is complex to update and synchronize the FIFO pointer updates at the fast burst rate demanded by the bus.

An alternative prior art approach to using a FIFO is using a "dual-port" RAM, but this also has disadvantages. A Dual-port RAM is merely a more general implementation of the above FIFO and therefore suffers from the same read write pointer, data valid complexities.

What is needed is a mechanism that will allow an adapter or other device moving data between two clock domains to efficiently transmit data in a burst mode on the faster clock domain without the design and control complexities of prior art solutions.

SUMMARY OF THE INVENTION

The present invention entails using one or more qualified burst caches (QBCs) in transferring data. Each QBC is an area of memory of a size N that can be accessed by either side of a transfer connection, but not by both sides simultaneously.

The invention differs from the "dual-port" RAM implementation in that each QBC must be qualified before any data is transmitted out of it. When qualified, all the data written to a given QBC is marked as valid and the QBC can be read in burst mode in its entirety. Being qualified indicates that either the QBC is full or that no more data will be written to the QBC by the transmitting side because the transmitting side has no more data to send because the entire data block has been transmitted.

In the current invention, the complexity of maintaining the read/write pointers and the data valid issue is eliminated. A two bit handshake per QBC is used to indicate when a QBC is valid to be read, or when it is empty and can be written. In the case where a QBC can be read and written from both directions, these two bits will have different meaning depending on the direction in which data is passing through the QBC.

While the invention may be understood in terms of using just one QBC between two different clock domains, much greater performance advantage can be achieved by using at least two independent QBCs, either of which can be accessed independently of the other by the different clock domains.

DESCRIPTION OF THE PREFERRED EMBODIMENT

Figure 1:
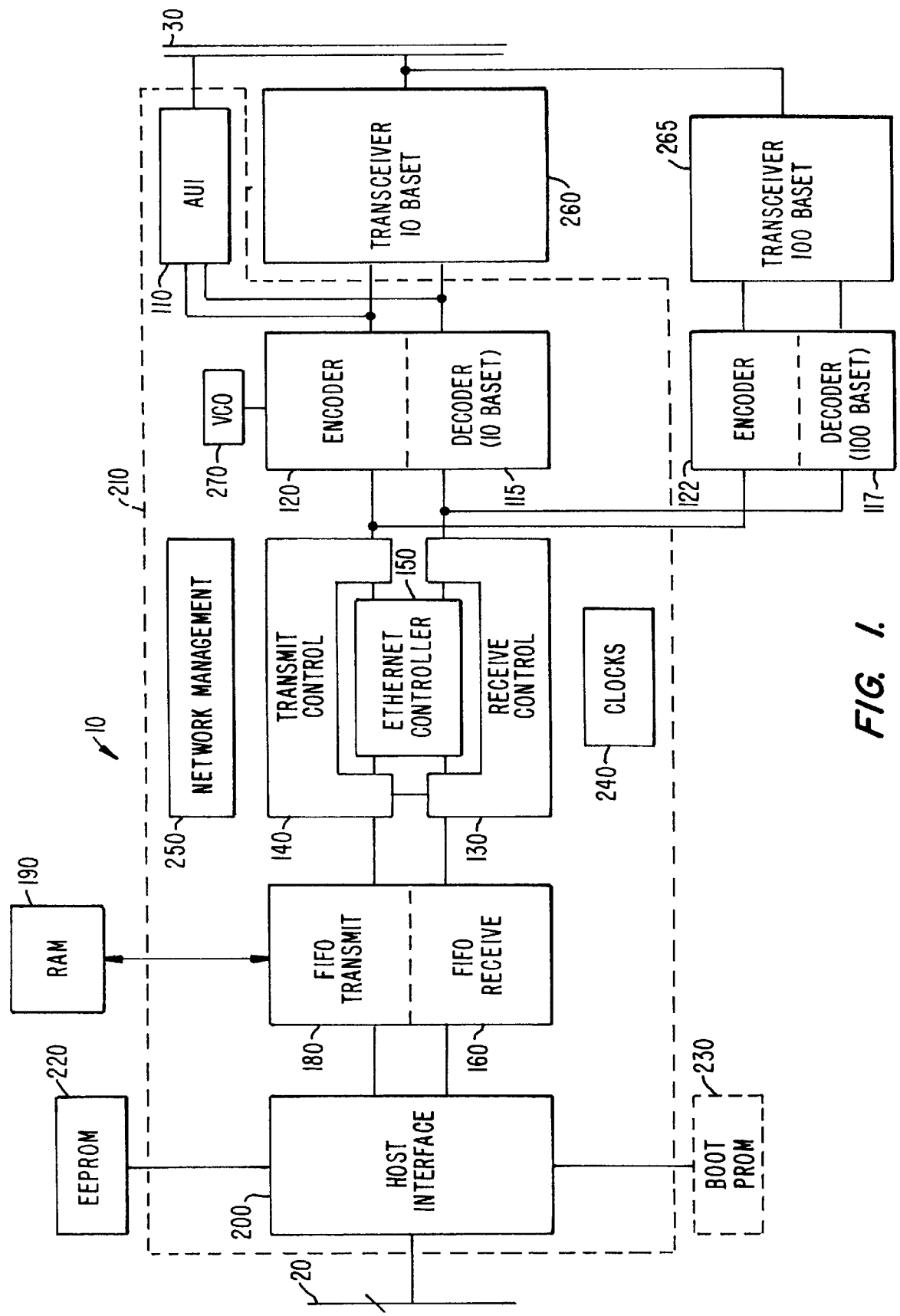
FIG. 1 is a block diagram of an advanced network adapter in which the present invention may be effectively employed.

FIG. 1 illustrates one example of an advanced network adapter in which the present invention may be effectively employed. This example is intended to be illustrative and not limiting.

Adapter 10, shown in FIG. 1, comprises a number of components coupled between a host computer system bus 20 and communications network media 30.

Figure 2:
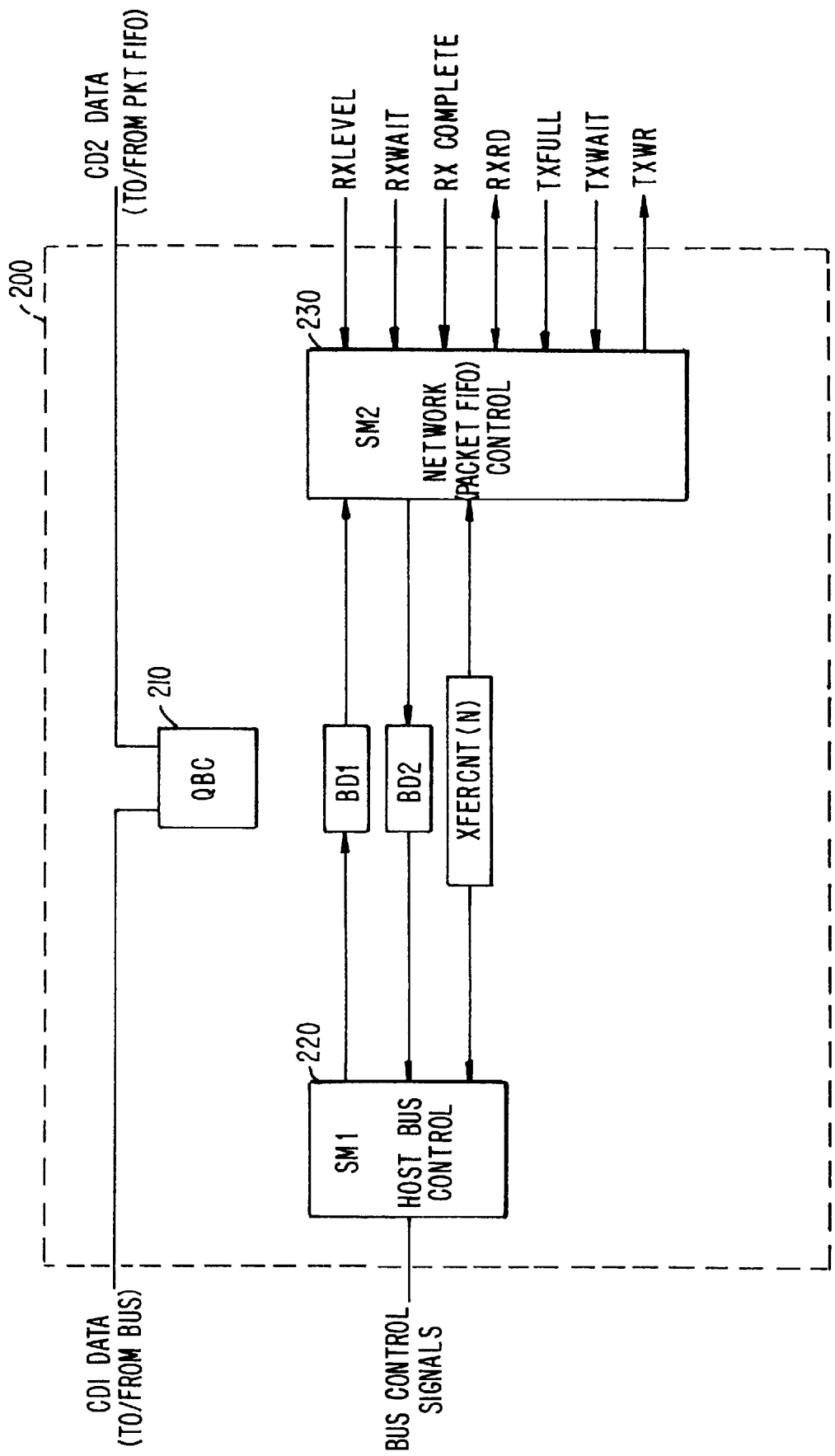
FIG. 2 is simplified block diagram of a host interface using one QBC in accordance with the invention.

At the host side, host interface circuitry 200 provides circuitry necessary for effectively operating on the host's system bus 20. According to the invention, this circuitry includes QBCs as shown in FIG. 2. Interface 200 contains all of the control circuitry necessary to operate effectively as a bus master on bus 20, as is described in more detail below.

Interface circuitry 200 on the adapter side connects to receive First In First Out (FIFO) circuitry 160 and to a transmit (TX) RAM FIFO 190. These RAMS provide one level of packet data buffering on the adapter, and are designed to receive and buffer packets at essentially network speeds. These on-adapter FIFOs may also both be coupled to an off or on-chip additional RAM FIFO 190 which provides further data buffering. Receive control circuitry 130 and transmit control circuitry 140 are both coupled to ethernet controller 150 which formats data appropriately for transmission on a ethernet-type network.

The example adapter shown in FIG. 1 also includes two sets of encoder/decoder circuits and two transceivers, allowing the adapter to operate at two different network speeds. As an example, decoder circuitry 115 and encoder circuitry 120 connect with transceiver 100 and Attachment Unit Interface (AUI) 110 to allow for transmissions at 10BaseT ethernet and decoder circuitry 117 and encoder circuitry 122 connect with transceiver 265 to allow for transmissions at 100BaseT ethernet.

A subset of the circuitry discussed thus far is shown in FIG. 1 enclosed by a dotted line to indicate that this circuitry may all be contained within a single Application Specific Integrated Circuit (ASIC) 210. ASIC 210 also employs an EEPROM 220 coupled to host interface 200 to provide configuration data such as station address, and it may also optionally employ a boot PROM 230 for automatic network configuration. Also contained within and employed throughout ASIC 210 are clocks 240 and network management circuitry 250 to manage various network status signals. A voltage controlled oscillator (VCO) 270 is also coupled to decoder 115 and encoder 120. Those circuit units included in ASIC 210 are included as examples, and different configurations of ASIC 210 including different sets of the components shown in FIG. 1 are possible.

In one example of an adapter according to the invention, data transfer operations between adapter 10 and the host are performed preferably through adapter 10 acting as a bus master on host bus 20.

One complication of the function of adapter 10 is that the data on bus 30 is generally transferred at an effective data rate of up to 100 Mbps, while the effective data rate on system bus 20 can be as high as 1,056 Mbps. As discussed above, these two different speeds of operation may be referred to as two clock domains.

In the circuit shown in FIG. 1, the two clock domains exist at either side of host interface 200. Clock Domain 1 (CD1) includes the host system bus and bus interface circuitry within host interface 200. Clock Domain 2 (CD2) includes the other adapter components shown in FIG. 1 and the network 30.

According to the invention, a qualified burst cache mechanism resides within host interface 200 and provides a means for transferring burst data between the two clock domains, CD1 and CD2. Using the QBC, the invention allows for efficient use of the high speed system bus 20 in burst mode even when data is being transmitted at much slower speeds within the network clock domain.

FIG. 2 is a block diagram illustrating burst data transmission between CD1 and CD2 using a QBC 210 according to the invention. According to the invention, interface 200 maintains two state machines to control QBC 210, state machine one (SM1) 220 controls reads and writes to QBC 210 from CD1, and state machine two (SM2) 230 controls reads and writes to QBC 210 from CD2

QBC 210, according to one embodiment of the invention, is controlled by two 1-bit handshaking signals, BD1 (bit domain 1) and BD2 (bit domain 2) and the state of the direction of data transfer, which is determined by other circuitry on the adapter card and is known to SM1 and SM2. These three states indicate whether the cache is being written or read by a particular clock domain and when it is ready for access by the other domain.

The operation of QBC 210 with respect to these three states in accordance with one embodiment of the invention is illustrated in the following table.

TABLE 1

| CD1-->CD2 | BD1 | BD2 | |
|---|---|---|---|
| 1 | 0 | 0 | QBC is empty and may be filled by CD1 |
| 1 | 0 | 1 | CD2 is reading data from QBC |
| 1 | 1 | 0 | QBC is full and valid, waiting to be read by CD2 |
| 0 | 0 | 0 | QBC is empty and may be filled by CD2 |
| 0 | 1 | 0 | CD1 is reading data from QBC |
| 0 | 0 | 1 | QBC is full and valid, waiting to be read by CD1 |

The operation of the described circuits in accordance with the signals shown in Table 1 is as follows. In the case where data is moving from CD1 to CD2, i.e. CD1→CD2=1, BD1 and BD2 both being 0 indicates that the QBC is idle and may be written to at any time by CD1. Once CD1 has filled QBC 210, it sets BD1 to 1. This informs SM2 that QBC 210 contains valid data and can be read by CD2 at any time.

When CD2 begins reading data from QBC 210, it sets BD1 to 0 and sets BD2 to 1. When CD2 has finished reading data from QBC 210, SM2 deasserts BD2. This is the interlock which tells SM1 that QBC 210 is again available to accept data. No data can be written to a given QBC if it is currently being read out of by the other clock domain.

According to a further embodiment, a QBC according to the invention is able to efficiently handle a situation where the QBC is not full but all the data to be transferred has been entered into the QBC and the transfer is therefore complete. In this embodiment, the state machines SM1 and SM2 are enabled to receive a signal XFERCNT(N) which specifies the number of valid bytes present in the QBC. This signal is presented from the writing SM to the reading SM at the same time that reading is enabled. In one specific example, this signal is transmitted as a parallel word wide enough to indicate the entire QBC. With a QBC of 128 bits, for example, XFERCNT(N) would by a seven bit wide signal.

FIG. 2 shows additional control signals used by host interface 200. In a specific embodiment, these signals as well may include parallel bit signals. These signals have the following functions:

RXLEVEL—used by RX FIFO to indicate how much data it has.

RXWAIT—used by RX FIFO to indicate that it is momentarily unable to supply RX data on DATA. This occurs when data is being fetched from the FIFO RAM. RXWAIT is independent of RXLEVEL.

RXCOMPLETE—used by RX FIFO to indicate that the current RX packet has been fully received into the FIFO RAM. The logic in (200) uses RXCOMPLETE and RXLEVEL=0 to determine when all of the data for an RX packet has been moved out of RX FIFO.

RXRD—read strobe use by (200) to indicate that it has taken some data from RX FIFO on DATA. RX FIFO uses this signal to advance the FIFO to the next datum. (200) shall not assert RXRD when RXWAIT is true, nor when RXLEVEL=0.

TXFULL—used by TX FIFO to indicate that it has no more space available.

TXWAIT—used by TX FIFO to indicate that momentarily it is unable to accept data on DATA. This occurs when TX FIFO is busy storing the last datum to the FIFO RAM.

TXWR—used by (200) to write the data on DATA to the TX FIFO. TXWR shall not be asserted when TXWAIT is true, nor when TXFULL is true.

Multiple OBCs

Figure 3:
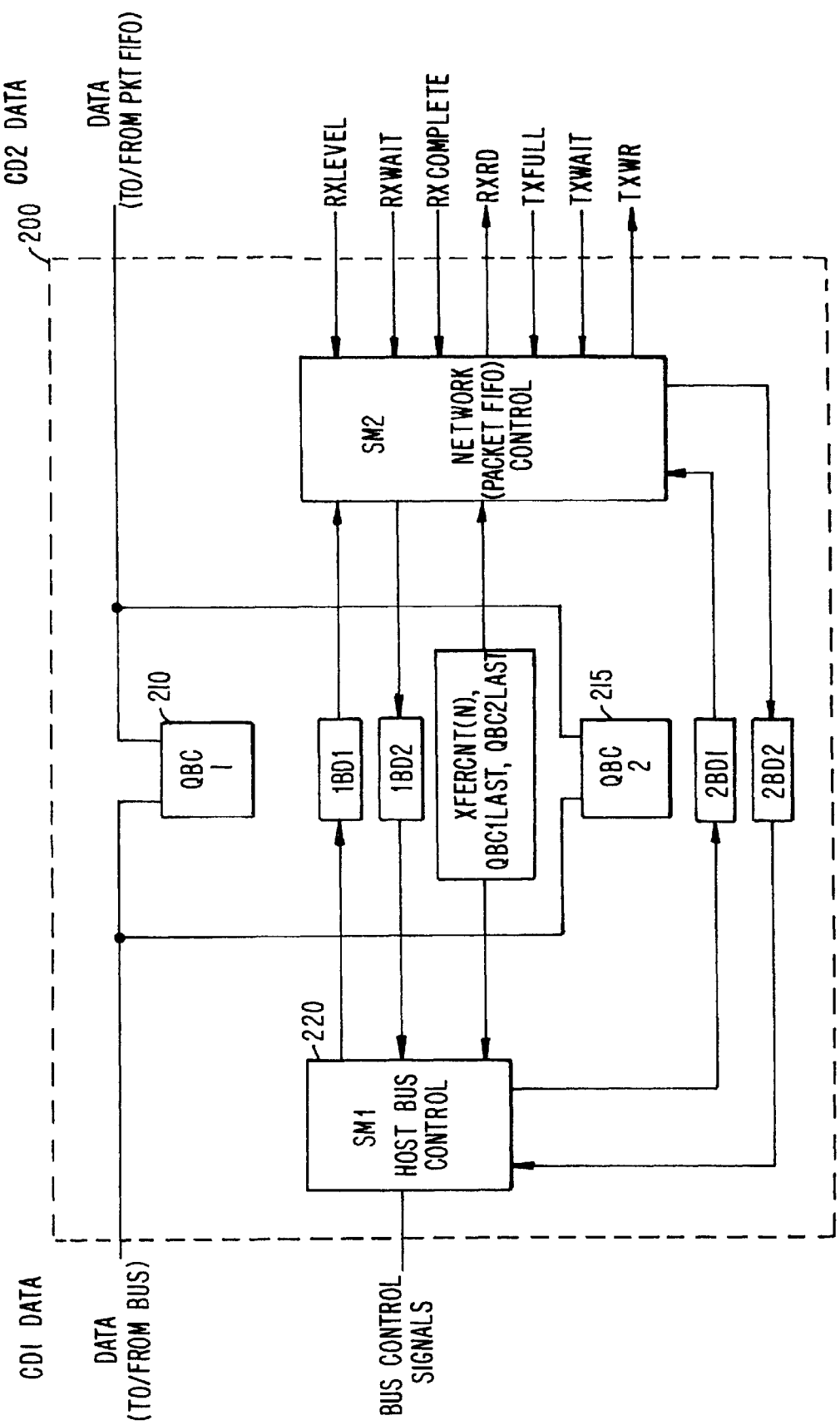
FIG. 3 is simplified block diagram of a host interface using more than one QBC in accordance with the invention.

As suggested above, the performance improvement of a QBC according to the invention can be greatly enhanced when two or more memory caches in a QBC are used to facilitate burst data transfers between two clock domains. FIG. 3 illustrates a host interface 200 containing two QBCs 210 and 215. In this embodiment, QBC1 can be read by CD2, while QBC2 is being filled by CD1.

Where there are two QBCs, a total of four handshake signal bits are used to control reads and writes to the QBCs, two for QBC1 210 and two for QBC2 215. In addition, the state machines keep track of which was the last QBC either read from or written to and force the QBCs to be accessed sequentially for both reads and writes. Each QBC is essentially controlled independently according to the signals shown in Table 1.

According to the embodiment shown in FIG. 3, when data is being written from CD1 to CD2, CD1 first fills QBC1, then CD1 fills QBC2, then CD1 examines QBC1 to see if the data placed there has been read yet and if QBC1 is empty. If it is, SM1 continues writing data. If QBC1 is not empty, SM1 halts writing data and waits for SM2 to deassert signal 1BD2.

When there are multiple QBCs, in order to efficiently handle the situation where a QBC is not full but all the data to be transferred has been entered into the QBC and the transfer is therefore complete, SM1 and SM2 are enabled to send and receive a signal XFERCNT(N) which specifies the number of valid bytes present in the QBC, as well as signals QBC1LAST, QBC2LAST indicating which of the QBCs hold the last of the data to be transferred. These signals are presented from the writing SM to the reading SM at the same time that reading is enabled.

Alternative Embodiments

The present invention is not limited to transferring data between a host and a network, but can be generalized to data transmissions between any two separate clock domains or any two logic functions which exist in separate clock domains.

The present invention is also not limited to just one or two alternating burst caches, but the techniques of the invention may expanded to any number of burst caches, each having its own 2-bit handshake. In this embodiment, QBCs would be written and read sequentially from cache 1 to N and back to 1 again based on whether the next cache is available to be written or is valid.

The invention has now been explained with reference to specific embodiments. Other embodiments will be apparent to those of skill in the art. In particular, method steps have been grouped and labeled as being part of various sub-methods in order to increase clarity of the disclosure, however, these steps could be differently grouped without changing the essential operation of the invention. It is therefore not intended that this invention be limited, except as indicated by the appended claims.

What is claimed is:

1. A qualified burst cache for transferring blocks of data between a first clock domain and a second clock domain comprising:

a) a first memory cache for storing a block of data;
   b) a first state machine associated with said first clock domain for controlling when said first memory cache may be read from or written to by said first clock domain and for performing lock out; and
   c) a second state machine associated with said second clock domain controlling when said first memory cache may be read from or written to by said second clock domain and for performing lock out wherein each memory cache is controlled by two handshake signals and by the state of the direction of data transfer.

2. The device according to claim 1 wherein said first state machine and said second state machine communicate with one another by means of a set of handshaking signals.

3. The device according to claim 1, further comprising a second memory cache for storing a second block of data.

4. The device according to claim 1, further comprising a plurality of second memory caches for storing a plurality of second blocks of data.

5. The device according to claim 2 wherein at least one state machine communicates to another state machine a signal indicating an amount of data in said qualified memory cache.

6. A method for transferring data between a first clock domain and a second clock domain comprising:

storing data from said first clock domain in a memory cache until said memory cache is full or until there is no more data to be received;

marking said memory cache as qualified by said first clock domain and releasing control of said memory cache to said second clock domain; and transferring data from said memory cache by said second clock domain in a burst mode until said memory cache is empty and releasing control of said memory cache to said first clock domain wherein each memory cache is controlled by two handshake signals and by the state of the direction of data transfer.

7. A data communications adapter apparatus for coupling a host computer to a computer network employing communications media, the adapter comprising:

a. a transceiver coupled to receive and transmit data over the media;

b. a transmit data buffer;

c. data transmit control circuitry coupled to said transceiver, to said transmit data buffer, and to said host computer, for generating a packet transmit signal causing said transceiver to begin transmitting data from said transmit data buffer over said communications media;

d. a receive data buffer;

e. data receive control circuitry coupled to said transceiver, to said receive data buffer, and to said host computer, for storing data received by said transceiver in said receive data buffer;

f. host interface circuitry; and g. a qualified burst cache for receiving and transmitting data on said host computer's system bus in burst mode controlled by a host-side state machine and for receiving and transmitting data on said adaptor at computer network speeds controlled by a network-side state machine and wherein said state machines communicate via three handshaking signals, two signals indicating whether said cache is being accessed by a either said host or said network, and one indicating a number of valid bytes of data in a qualified cache.

8. The adapter of claim 7, further comprising:

h. ethernet control circuitry; and wherein said ethernet control circuitry, said host interface circuitry, said qualified burst cache, said data receive control circuitry, said data transmit control circuitry, said receive data buffer and said transmit data buffer are all contained in a single Application Specific Integrated Circuit (ASIC).

9. The adapter of claim 7, wherein said data receive control circuitry is programmable.

* * * * *